United States Patent [19]

Roberts et al.

[11] 4,043,908

[45] Aug. 23, 1977

[54] PROCESS FOR CLEANING OF A DISPERSION OF DISPERSED PARTICLES

[75] Inventors: Kelvin Roberts, Osterskar; Barbro Margareta Stenqvist, Vasterhaninge, both of Sweden

[73] Assignees: Kemanord Aktiebolag, Stockholm; Sala International AB, Sala, both of Sweden

[21] Appl. No.: 666,104

[22] Filed: Mar. 11, 1976

[30] Foreign Application Priority Data

Mar. 11, 1975 Sweden .................................. 7502720

[51] Int. Cl.$^2$ ................................................ C02B 1/20
[52] U.S. Cl. ........................................ 210/43; 210/44; 210/51; 162/5
[58] Field of Search ................... 210/43, 42 R, 45, 47, 210/49, 51, 52, 53, 54, 59, 21, 22 R, 44; 162/5

[56] References Cited

U.S. PATENT DOCUMENTS 2,005,742  6/1935  Hines ........................................ 162/5

Primary Examiner—Thomas G. Wyse
Assistant Examiner—Benoit Castel
Attorney, Agent, or Firm—Fred Philpitt

[57] ABSTRACT

This invention pertains to a method for removing small impurity particles and dissolved substances from an aqueous dispersion or pulp slurry. The invention in particular pertains to a method for deinking of newsprint. In its most general aspect the invention relates to removing of dissolved substances, preferably organic substances and small impurity particles from an aqueous dispersion.

8 Claims, No Drawings

PROCESS FOR CLEANING OF A DISPERSION OF DISPERSED PARTICLES

BACKGROUND

Previously known methods for deinking of newsprint involve the production of a slurry of the paper in an aqueous alkaline solution containing sodium silicate, an anionic or nonionic surface active agent and a bleaching agent. The mixture is warmed up to 50° – 70° C with stirring to remove the ink from the paper in the form of a dispersion. Following this, the pulp can be separated either by (a) sieving, followed by rinsing and pressing, whereby considerable quantities of polluted water are obtained, or (b) by direct flotation of ink from the pulp by the addition of a soap, either before or after the pulping, and afterwards addition of a calcium salt to the mixture, whereby a calcium soap precipitates out and this together with the ink can be floated off. In this case there remains a mixture of paper pulp and clear water.

The problem with this known method is that large quantities of highly polluted water are obtained which are difficult to clean. This water usually has to be cleaned before it can be released into surface water. The costs for such cleaning are considerable.

The problem with the second method is that flotation with a calcium soap is not sufficiently selective, and a certain amount of pulp fibers are also floated off. Further, it has been discovered that ink flocs adhere to walls, pipes and scrapers of the deinking apparatus, and this necessitates closing down the equipment about one day a week for cleaning. Further, these ink flocs which become attached to the equipment can break loose and discolor the deinked pulp. Another problem with methods utilizing high pH-dispersions at high temperatures is that a discoloration (yellowing) of the pulp occurs and this necessitates the inclusion of relatively expensive chemical bleaching systems in the deinking process.

Newsprint inks are composed of two main types: so called letterpress ink and offset ink. Both types contain binders, which are organic compounds often with anionic groups, and an organic oil. As pigment particles carbon black is mainly used, with or without an organic pigment, also called toner. Colored printing inks contain principally organic pigments.

THE PRESENT INVENTION

Our invention pertains to a method for deinking paper pulp, wherein a clean pulp and a clean colorless water are obtained as final products. Our methods is simple and relatively cheap and can be carried out in existing deinking equipment. Further, the method is controllable. The invention is specially suitable for deinking of newsprint.

According to the present invention it has been found that dissolved or dispersed substances and/or small particulate impurities can effectively be removed from aqueous dispersions by adding at least one surfactant to the aqueous dispersion so as to form micellar solution of the organic substances and/or particulate impurities, thereafter precipitating the micelles, and then removing the precipitate.

One advantage of using this method in deinking is that the process conditions for dissolving ink from the newsprint are less severe than conventional methods which disperse the ink in the form of a finely-dispersed emulsion. This means that the present method can be used at lower pH and/or lower temperatures than the previously described methods and this reduces the tendency of the pulp to become yellow. Another advantage is that there is no need, or very little need, for expensive bleaching chemicals. Still another advantage is that the waste water from the plant is almost free from impurity chemicals. Micellar solutions as such and the method for preparation of them are well known, see e.g. Friberg S, Mandell L, and Larsson, H, J. Colloid Interface Science 29, 155 (1969) or Friberg, S, J. Am. Oil Chem. Soc. 48, 578 (1971). The rules for the formation of micellar solutions are quite different from the rules governing the formation of emulsions.

The concentration at which micelles are formed from surfactants in water depends on the relative contribution of the hydrophobic organic portions and polar groups of the surfactants. These properties are well known to persons skilled in the art and the concentration in water at which micelles are formed range from below $10^{-6}$ molar to $10^{-1}$ molar, depending on the surfactant employed. The amount of surfactant for a given pulp slurry in order to achieve a micellar solution can easily be determined by simple routine tests which are known in the art, as exemplified by the above references.

According to one embodiment of the present invention paper is first broken up (pulped) in water, to which is added at least two surfactants, one of which is anionic and can be precipitated by addition of at least one cation and the other of which has the property of forming a complex with the anionic surfactant in an amount sufficient for the formation of micelles containing the oil and binder, whereafter the micelles formed are precipitated by the addition of at least one cation and thereafter the precipitate is removed by known techniques, e.g. by flotation, sedimentation, filtration or centrifugation. Very clean pulp and clear water are hereby obtained. Pulp can afterwards be separated from water by sieving and pressing. According to another embodiment of the present invention, paper is first broken up (pulped) in water, to which is added one or more surfactants at a siuitable pH value, for example 8–10. At least one of the surfactants in the mixture is of such a type that the charge of the surfactant changes with a changed pH value, and at the pH value chosen for the pulping the surfactant or surfactants are anionic or nonionic. One or several anionic surfactants can also be added dissolved in this surfactant to mixture of surfactants. The mixture is warmed up and stirred to obtain a colloidal dispersion of ink particles and a solubilization of oil and binder in micelles. Afterwards the pH of the mixture can be reduced by addition of an acid to an extent whereby one surfactant becomes cationic. This pH depends on the specific surfactant used and pH should in normal cases be reduced to 7 or lower. At this pH precipitation occurs of the micelles containing oil, binder and the ink particles, and these can be removed from the pulp slurry using known techniques, e.g., by flotation, sedimentation, filtration or centrifugation. Very clean pulp and clear water are hereby obtained. The pulp can afterwards be separated from water by sieving and pressing.

It is possible to separate pulp by sieving from the alkaline mixture of pulp, water and ink micelles. In this case a certain amount of rinsing water is required to rinse the pulp clean from the precipitated colour. Through a sequence of rinsing and pressing the amount of rinsing water can be kept to a minimum. After separation of the pulp, the pH value of the mixture of filtrate and rinse water is reduced. As soon as a pH value is obtained which gives rise to partial protonising of the surfactant used, e.g., an amine, a flocculation of the ink micelles occurs. If a more rapid flocculation is desired, the pH value can be reduced to e.g., 5 or below and a polymer of high molecular weight added. The flocs obtained can afterwards easily be separated either by flotation or through sedimentation, filtration or centrifugation. This more rapid flocculation process, in which a polymer of high molecular weight is added, is not desirable for use when pulp has not previously been separated, since flocculation will then be so strong and will occur so rapidly than even paper fibers in this case can easily be entrapped in the flocs.

Polymers of high molecular weight preferably, from $0.5 \times 10^6$ to $15 \times 10^6$, are used to obtain a rapid aggregation of particles. The process is called "flocculation" and the added polymer "flocculant". The manner of choosing a suitable polymer in order to achieve a desired degree of flocculation is well known to those skilled in this art.

In the system here described, polymers of anionic character are preferred since the micelles precipitated have a cationic charge. Anionic polymers are in general cheaper than cationic. It is also possible to use nonionic polymers.

The method here described for deinking of printed paper can also be used when colloidally dispersed particles together with dissolved substances are to be removed from a water dispersion containing larger fibers or particles. It is also possible to clean an aqueous dispersion of colloidal impurities by the present method, since in practically all naturally-occuring systems, the natural impurities are of anionic character, be they particles or organic substances. In the same manner as described above the pH is adjusted to a suitable value in the dispersion to be cleaned in the presence of a surfactant, so that the colloidal impurities are suspended in surfactant micelles (e.g. form a micellar solution).

If it is desired to remove all the colloidal materials from the dispersion it is afterwards possible to directly reduce the pH of the suspension alternatively add at least one cation thereafter it is optional to add a polymer if this is necessary for obtaining a flocculation or if more rapid flocculation is required. The flocs can thereafter be separated from the aqueous phase by any known technique, e.g., through flotation, sedimentation, filtration or centrifugation. This procedure is specially suitable for flotative removal or sedimentation of solid or micellar dissolved impurities from waste water.

If a pulp dispersion is to be cleaned of particulate impurities, one possibility is to form micelle flocs before separation from the pulp, and then float off the flocs from the pulp and water solution. In this case it is unsuitable to add a polyelectrolyte since floc formation and flotation in this case will not be sufficiently selective, and even pulp is floated off.

Another possibility is to sieve the pulp from the mixture of pulp, water and particle-containing micelles at a certain pH value, to rinse the pulp with water, and thereafter decrease the pH value in the mixture of filtrate and rinse water and possibly add a polyelectrolyte for more rapid floc formation. These flocs can be separated from the clear water solution either by flotation or by other known method such as sedimentation.

On addition of surfactants it is necessary to take into consideration that the amount added must be sufficiently large so that micelles are formed according to the earlier cited references, both when the surfactants are anionic and nonionic respectively.

A few background comments about micelle formation may be helpful. On dissolving a surface active agent in water, at a certain concentration so called "micelles" are formed. These consist of more or less spherical aggregates of surface active molecules, in which the hydrophobic parts of the molecules point inwards towards the center of the sphere and the hydrophilic regions of the molecules are oriented out towards the continuous waterphase. In these micelles it is possible to dissolve e.g., hydrophobic colloidal particles, amphiphilic substances, or oil. The intention with our invention is to bring about precipitation of these micelles which contain particles of dirt or printing ink which it is desirable to remove from the mixture.

The precipitation according to one aspect can be carried out in the following manner. The micelles then must comprise two or more surfactants, two of which form a complex with each other. The addition of a cation then brings about a precipitation of the first surfactant in the micelle and gives rise to removal of the other, to which it is complexed, together with the other components of the micelle.

The precipitation according to another aspect is brought about by using as surface active molecules one or more surfactants which at the original pH value of the solution are nonionic or anionic and which on reducing the pH value, become cationic.

With printing ink which contains a so-called binder, which is negatively charged in aqueous solution, a negative micelle is obtained initially, regardless of whether a nonionic surfactant or an anionic surfactant is used. When the pH value of the solution or dispersion is reduced, the surfactant molecules in the micelles become successively more positively charged. Since the ink molecules in the micelles are negatively charged, a neutralization of the reaction occurs, and thereby a precipitation and agglomeration of the micelles occurs. If the pH value is further reduced, micelles are obtained with a net positive charge. On addition of a negatively charged substance to the mixture, a strong agglomeration and precipitation of the micelles is obtained, together with the negatively charged substance. As the negatively charged substance various polymeric materials can suitably be employed.

It is also possible to dissolve in the micelles initially an anionic surfactant such as a fatty acid soap or a rosin acid soap. The particle-containing micelles are thereby anionic regardless of whether the colloidal particles or impurities which are to be dissolved are negatively charged or neutral. The pH value of the system of these negatively charged micelles can thereafter be reduced, whereby the micelles are neutralized since one of the surfactants becomes positively charged and the micelles flocculate and precipitate.

When the micelle flocs are to be separated by sedimentation it is advantageous to dissolve in the original micelles, together with or instead of the anionic surfactants, an anionic polymeric material. Another possibility is to add to the acidified cationic micelles a polymeric material such as an anionic polyelectrolyte.

When the micelle flocs are to be separated by flotation, one can add to the acidified cationic micelles an anionic surfactant such as a soap, such as sodium caprylate or sodium stearate, a lauryl sulphate, an aryl sulphonate, an alkyl- or aryl phosphate or a polymeric material with anionic groups, such as a polyacrylate or a polystyrene sulphonate. When the precipitated micelles are to be floated off from a dispersion of solid particles, it is preferred to avoid the use of a polymeric material so that selectively is obtained. In certain cases only a monomeric material gives selectivity.

As a surfactant which in acid solution is cationic, for deinking of newsprint, it is advantageous to use a primary, secondary or tertiary amine with the general formula of $R_1R_2R_3N$, in which at least one of the R groups, i.e., any of the groups $R_1$, $R_2$ and $R_3$ is an aliphatic group or an aryl group or an alkylaryl group, which chains may be interrupted or substituted with inert, non-interfering substituents, preferably oxygen or sulphur. Aliphatic chains in this case should contain between 5 – 35 carbon atoms, preferably 12 – 20 carbon atoms, and the chains can be saturated or unsaturated, straight or branched. Examples of such chains are decyl-, dodecyl, tetradecyl-hexadecyl and octadecyl groups or oleyl or linoleyl groups. When R represents an aryl group it can suitably represent phenyl, toluyl or ortho-, meta- or paraxylyl. R as an alkyl aryl group can be a nonyl phenyl group. The R-groups can be different or be the same alkyl groups. Other surface active agents suitable in such systems are the corresponding arsenes, phosphenes and stilbenes with the general formulas $R_1R_2R_3As$, $R_1R_2R_3P$ and $R_1R_2R_3Sb$, in which $R_1$, $R_2$ and $R_3$ have meanings given above. $R_1$, $R_2$ and $R_3$ can even represent hydrogen, though at least one of the groups must represent an aliphatic chain, an aryl chain or an alkyl-aryl chain with the above meanings. The R-groups can further represent polyethylene oxide, $HO(CH_2CH_2O)_nH$ or polydimethylesiloxane $(MeSio)_n$. Further combination and variations are known. Preferably we use amines with the general formula $R_1NH_2$, $(R)_2NH$, $RN(CH_3)_2$, where R consists of an alkyl- or alkenyl group containing 8–20 carbon atoms; $RO(CH_2)_3NH_2$, where R is an alkyl group containing 6–18 carbon atoms; and/or ampholytes with the general formula $R-NH_2^+(CH_2)_n-COO^-$, where R consists of an alkyl- or alkenyl group containing 8–20 carbon atoms, together with polyoxyethylene or polyoxypropylene derivatives of the amines or amphoteric agents containing 4–40 oxyalkylene groups. Specially suitable are surfactants with the formula

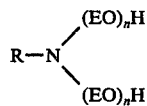

in which R represents an oleyl group and EO represents a $(CH_2-CH_2-O)$ group and $n$ suitably represents 2 to 20, preferably 2, 4 or 6. One or more of the above named R-groups can contain anionic groups which are protonized totally or partially on reduction of pH. The anionic groups can be of type $COO^-$, $SO_4^-$, $SO_3^-$ and $PO_4^-$. These surfactants can be described as amphoteric and can have the same formula of type $R_4-NH-CH_2-CH_2-COOH$ and $R_4-NH-CH_2COONa$ where $R_4$ has the same meaning as $R_1$, $R_2$ and $R_3$. An example of such a surfactant is N,N-dihexaethoxyoleylamine

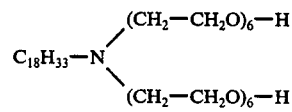

This surfactant is nonionic at pH 8 and cationic at pH 7 or below. This dispersion of the printed newspaper is suitably carried out at pH $\geq$ 8, and the pH value is afterwards reduced to 5 or 6, whereafter the dispersion is flotated. Alternatively fibres can be separated from the colour-containing water by sieving, and the pH in the separated colour-containing water reduced to 5 or below, after which an anionic polymer, i.e., a polyacrylamide derivative with molecular weight = $12 \cdot 10^6$ and degree of charge 40% is added. Flocculation of the precipitated colour micelles occurs and separation is carried out in the conventional manner.

On deinking of newsprint, the suspension of the colour occurs at a temperature of 5°–100° C, suitably 25°–60° C and preferably 25°–40° C. Also acidification, flocculation, sieving flotation or sedimentation are suitably carried out at the same temperature. Both on precipitation of the ink micelles by acidification to approximately pH 7, preferably pH 6, or even with the acidification to about pH 5 or below and addition of a polyelectrolyte, complete precipitation is obtained. It occurs more rapidly however on addition of polyelectrolyte. The retention time in the flotation cell can in the first case be 15 mins to 1 hour, and after sieving and addition of polyelectrolyte separation with flotation occurs within 5–10 mins.

As examples of surfactants in micelles which are suitable for precipitation by the addition of a cation, can be mentioned aliphatic amines, where the aliphatic groups have the above-mentioned meaning, together with fatty acid soaps, the "fatty" group being an aliphatic group containing 8–35 carbon atoms, preferably 8–20 carbon atoms, preferably being an alkyl group or an alkenyl group. The complex formation between a soap and an amine is known, see e.g. Friberg, S, et al, Kolloid Z.U.Z. fur Polymere 243, 56 (1971) and the soap can be precipitated by the addition of at least one suitable cation, such as $Ca^{2+}$ or $Mg^{2+}$, in a known manner. If a soap and an amine is present in a micelle, the above-mentioned addition gives a precipitation of the micelle. A precipitation of a micelle can easily be characterized in that the precipitated aggregates immediately after the formation have a size corresponding to the size of a micelle, i.e., a size in the range of from 20 A to about 1000A.

The following experiments were carried out to illustrate the deinking of newsprint, which is a preferred embodiment of the invention. However, it will be appreciated that the invention is applicable to any water dispersion containing impurities and dissolved substances.

EXAMPLE 1

Newspaper was dispersed in a surfactant solution. The pulp slurry was diluted to a newsprint content of 4% and a surfactant concentration of 400 ppm. pH was adjusted to 8 – 9 by addition of sodium hydroxide. Afterwards the temperature in the mixture was raised to 40° – 45° C and the mixture was allowed to stand for 1.5 hours with stirring 1 min every half hour. Separation of the dissolved ink was carried out in two different ways.

Alternative 1 - The pH of the mixture was reduced by addition of hydrochloric acid, whereby the color micelles precipitated. The mixture was diluted to a pulp content of about 1% after which the micelle flocs were floated off.

Alternative 2 - The mixture was sieved, the pulp was pressed and rinsed. The rinsewater and the filtrate were mixed and the pH value of the mixture reduced to 5 by addition of hydrochloric acid. Afterwards polyelectrolyte was added, whereupon agglomeration and flocculation occured. The flocs were separated by flotation or sedimentation.

In the following table examples are given of the surfactants used. Separation of the dissolved color was carried out according to both alternative 1 and alternative 2.

The degree of deinking was determined in different ways. Different proportions of printed and unprinted paper were dispersed and handsheets were made of the pulps formed. The luminance of these hand sheets was measured, and was represented as a function of the percentage of unprinted paper in the handsheets. Pulp handsheets were prepared from the washed and sieved pulps in the same way, after which luminance was measured. The luminance could then be converted from the graph described above in the form of degree of deinking.

In the following tables formulae are given for the surfactants that have been tested. The groups R in these chemical formulae are saturated alkyl groups, where no other information is given, containing the number of the carbon atoms given in the tables.

Table 1

| | Nonionic surfactants | | | |
|---|---|---|---|---|
| Example | Type of surfactants | Number of carbon atoms in group R | Flotation pH | Degree of deinking,% |
| 1 | R—N(CH$_2$CH$_2$OH)(CH$_2$CH$_2$OH) | 12 | 5.5 | 20–30 |
| 2 | R—N((CH$_2$—CH$_2$O)$_4$—H)((CH$_2$—CH$_2$O)$_4$—H) | 12 | 6.0 | 40–50 |
| 3 | R—N(CH$_2$CH$_2$OH)(CH$_2$CH$_2$OH) | 18 | 5.0 | 20–30 |
| 4 | R—N((CH$_2$CH$_2$O)$_6$H)((CH$_2$CH$_2$O)$_6$H) | 18 (R = oleyl) | 5.0 | 85–90 |
| 5 | R—N((CH$_2$CH$_2$O)$_4$H)((CH$_2$CH$_2$O)$_4$H) | 18 | 5.5 | 70 |
| 6 | R—N((CH$_2$CH$_2$O)$_{15}$H)((CH$_2$CH$_2$O)$_{15}$H) | 18 (R = oleyl) | 5.0 | 90–95 |
| 7 | R—N((CH$_2$CH$_2$O)$_8$H)((CH$_2$CH$_2$O)$_8$H) | 12 | 6.0 | 85–90 |
| 8 | R—N((CH$_2$CH$_2$O)$_{12}$H)((CH$_2$CH$_2$O)$_{12}$H) | 12 | 6.0 | 90–95 |

Experiments were also carried out by addition of a surfactant, which in basic solution was anionic and which became cationic in acid solution. In order to obtain a good suspension of the colour a longer time for pulping of the paper was required than when the original surfactant was nonionic. Otherwise equally good results were obtained.

Table 2

| | Amphoteric surfactants | | | |
|---|---|---|---|---|
| Example | Type of surfactants | Number of carbon atoms in group R | Flotation pH | Degree of deinking % |
| 1 | R—NH—CH$_2$—CH$_2$COOH | 12 , 14 | 4.5 | 20 |
| 2 | R—NH—CH$_2$CH$_2$COONa | 18 (R = oleyl) | 4.5 | 40–50 |

Successful experiments were also carried out by adding initially a mixture of an anionic surfactant and a nonionic surfactant which on acidification became an anionic surfactant together with a cationic surfactant.

The best results were obtained with a mixture of anionic surfactant and nonionic surfactant in the ratio 1:3.

The total amount of surfactant in these experiments was 400 ppm (reckoned on water).

Table 3

| Ex. | Anionic surfactant | Nonionic surfactant | Degree of deinking, % |
|---|---|---|---|
| 1 | Na-oleate | $C_{12}H_{25}-N\begin{matrix}(EO)_1-H\\(EO)_1-H\end{matrix}$ | 80 |
| 2 | acid complex phosphate ester | $C_{18}H_{37}-N\begin{matrix}(EO)_6-H\\(EO)_6-H\end{matrix}$ | 90 |

The surfactants used dissolved conventional letter press inks and the majority of offset inks (of newsprint about 24% by weight was printed by offset methods in 1974 in Sweden, the rest by letter-press methods). Further different rotogravure inks were tested on coated paper. In all these investigations the method worked successfully. With the procedure according to alternative 2 the polyelectrolytes used were polyacrylamide derivatives with a varying number of charged groups. The most suitable polyelectrolyte concentration was found to be 1-2 ppm (based on water).

Table 4
Polyetectrolytes

| Ex. | Type of polyelectrolyte (POLYACRYLAMIDE) | Degree of charge % | Molecular weight |
|---|---|---|---|
| 1 | Anionic | 12.5 | $5 \times 10^6$ |
| 2 | " | 20 | $15 \times 10^6$ |
| 3 | " | 25 | $6 \times 10^6$ |
| 4 | " | 37.5 | $5-6 \times 10^6$ |
| 5 | " | 40 | $12 \times 10^6$ |
| 6 | " | 50 | $5-6 \times 10^6$ |
| 7 | " | 62.5 | $3 \times 10^6$ |
| 8 | Cationic | 25 | $3 \times 10^6$ |
| 9 | " | 75 | $2-3 \times 10^6$ |
| 10 | " | 100 | $2-3 \times 10^6$ |

The resulting deinked, sieved and pressed pulp showed a degree of deinking of 95-100%.

In all these investigations the printing opacity of the pulp increased so much that it was shown to be better than for new paper.

The water from deinking contained less than 15 ppm of the original surfactants and quantities of polyelectrolyte below the detection limit. The retention time in the flotation cells by method 1) was 15 mins to 1 hour and by method 2) 5-10 mins.

EXAMPLE 2

Newsprint having a dry content of 4 percent by weight was soaked for 0.5 h in a solution of surfactants containing tertiary alkyl ethoxy amines and fatty acids, mainly containing unsaturated straight chain $C_{16}-C_{18}$ acids at a temperature of 45° - 50° C and at pH of 9.5 - 10.5.

The concentration of the surfactants was 0.75% by weight and 1 percent by weight respectively, based on dry newsprint.

After the soaking the pulp was broken up at the same pH and temperature as under the soaking. $Ca^{2+}$ was added and flotation was carried out at 45°-50° C and at a pH of about 10 in a pulp slurry having a dry content of 1%. The flotation time was in all runs 15 mins and the degree of deinking was determined as in the previous example.

The results are given in table 5.

Table 5

| Ex. | Type of surfactant | Amount surfactant % | Number of C atoms in R | Number of (EO)-groups | Degree of deinking |
|---|---|---|---|---|---|
| 1 | $R-N\begin{matrix}(EO)_n-H\\(EO)_n-H\end{matrix}$ Fatty acids | 0.75 0.25 | 16-18 | n = 5 EO = 10 | 85-90 |
| 2 | " | 0.75 0.25 | 16-18 | n = 3 EO = 6 | 85-90 |
| 3 | " | 0.5 0.5 | 16-18 | n = 3 EO = 6 | 85 |
| 4 | " | 0.5 0.25 | 16-18 | n = 3 EO = 6 | 87-93 |
| 5 | " | 0.5 0.25 | 16-18 | n = 1,5 EO = 3 | 87-96 |

We claim:
1. A process for purifying waste water containing organic and/or colloidal impurities obtained from deinking of paper, which process comprises:
   a. adjusting the pH to a value of about 8 or higher,
   b. adding a surface active amine or amino acid to the aqueous dispersion or pulp slurry in an amount sufficient to form a micellar solution containg the organic and/or colloidal impurities, said amount exceeding the critical micelle concentration of said surfactant, said amine or amino acid being cationic at a pH of 7 or lower,
   c. precipitating micelles of the micellar solution formed in step (b) by reducing the pH of the dispersion or slurry to a range of about 7 or lower, and
   d. removing the precipitate of micelles formed in step (c).

2. A process according to claim 1 wherein the surfactant is an alkyl or alkenyl amine having 8 – 20 carbon atoms in the alkyl or alkenyl chain, or an ethoxylated derivative thereof.

3. A process according to claim 1 wherein a polymeric flocculant is also added in step (c) to cause the formation of flocs of the precipitated micelles and that those flocs are removed.

4. A process for removing organic and/or colloidal impurities from an aqueous dispersion or pulp slurry, which process comprises:
   a. adjusting the pH to a value of about 8 or higher,
   b. adding a surface active amine or amino acid in combination with a fatty acid or rosin acid to the aqueous dispersion or pulp slurry in an amount sufficient to form a micellar solution containg the organic and/or colloidal impurities, said amounts exceeding the critical micelle concentration of said surfactant combination, said fatty acid or rosin acid having the ability to form a complex with the amine or amino acid,
   c. precipitating micelles from the micellar solution formed in step (b) by adding a polyvalent metal ion that forms an insoluble soap with said fatty acid, and
   d. removing the precipitate of micelles formed in step (c).

5. A process according to claim 4 wherein the surfactant is an alkyl or alkenyl amine having 8 – 20 carbon atoms in the alkyl or alkenyl chain, or an ethoxylated derivative thereof.

6. A process according to claim 4 wherein a polymeric flocculant is also added in step (c) to cause the formation of flocs of the precipitated micelles and that those flocs are removed.

7. A process for purifying waste water containing organic and/or colloidal impurities obtained from deinking of paper, which process comprises:
   a. adjusting the pH to a value of about 8 or higher,
   b. adding a surface active amine or amino acid to the aqueous dispersion or pulp slurry in an amount sufficient to form a micellar solution containg the organic and/or colloidal impurities, said amounts exceeding $10^{-6}$ molar based on the waste water, said amine or amino acid being cationic at a pH of 7 or lower,
   c. precipitating micelles of the micellar solution formed in step (b) by reducing the pH of the dispersion or slurry to a range of about 7 or lower, and
   d. removing the precipitate of micelles formed in step (c).

8. A process for removing organic and/or colloidal impurities from an aqueous dispersion or pulp slurry, which process comprises
   a. adjusting the pH to a value of about 8 or higher,
   b. adding a surface active amine or amino acid in combination with a fatty acid or rosin acid to the aqueous dispersion or pulp slurry in an amount sufficient to form a micellar solution containg the organic and/or colloidal impurities, said amount exceeding $10^{-6}$ molar based on the waste water, said fatty acid or rosin acid having the ability to form a complex with the amine or amino acid,
   c. precipitating micelles from the micellar solution formed in step (b) by adding a polyvalent metal ion that forms an insoluble soap with said fatty acid, and
   d. removing the precipitate of micelles formed in step (c).

* * * * *